US010108855B2

(12) United States Patent
Lim et al.

(10) Patent No.: US 10,108,855 B2
(45) Date of Patent: Oct. 23, 2018

(54) FITNESS DEVICE-BASED SIMULATOR AND SIMULATION METHOD USING THE SAME

(71) Applicants: ELECTRONICS AND TELECOMMUNICATIONS RESEARCH INSTITUTE, Daejeon (KR); UNIVERSITY-INDUSTRY FOUNDATION, YONSEI UNIVERSITY, Seoul (KR)

(72) Inventors: Young-Jae Lim, Daejeon (KR); Sang-Hoon Lee, Seoul (KR); Jong-Yoo Kim, Seoul (KR); Hak-Sub Kim, Seoul (KR); Sang-Joon Park, Daejeon (KR); Hee-Seok Oh, Anyang-si (KR); So-Yeon Lee, Daejeon (KR); Kyo-Il Chung, Daejeon (KR)

(73) Assignees: ELECTRONICS AND TELECOMMUNICATIONS RESEARCH INSTITUTE, Daejeon (KR); UNIVERSITY-INDUSTRY FOUNDATION, YONSEI UNIVERSITY, Seoul (KR)

( * ) Notice: Subject to any disclaimer, the term of this patent is extended or adjusted under 35 U.S.C. 154(b) by 18 days.

(21) Appl. No.: 15/205,149

(22) Filed: Jul. 8, 2016

(65) Prior Publication Data

US 2017/0046600 A1 Feb. 16, 2017

(30) Foreign Application Priority Data

Aug. 10, 2015 (KR) ........................ 10-2015-0112286

(51) Int. Cl.
*G06K 9/00* (2006.01)

(52) U.S. Cl.
CPC ................................ *G06K 9/00342* (2013.01)

(58) Field of Classification Search
CPC .................................................. G06K 9/00342
See application file for complete search history.

(56) References Cited

U.S. PATENT DOCUMENTS 7,840,031 B2 * 11/2010 Albertson .......... A63B 24/0003
382/103
8,094,881 B2 * 1/2012 Matsugu ............ G06K 9/00342
348/152

(Continued)

FOREIGN PATENT DOCUMENTS

KR 10-2014-0089647 A 7/2014
KR 10-2014-0144868 A 12/2014

*Primary Examiner* — Aaron W Carter
(74) *Attorney, Agent, or Firm* — LRK Patent Law Firm (57) ABSTRACT

A fitness device-based simulator and a simulation method using the simulator. The fitness device-based simulator includes a feature point extraction unit for acquiring action-sensing information of a user who is located on a fitness device, and extracting feature points for a body skeletal structure of the user based on the action-sensing information, a feature point cluster generation unit for generating multiple feature point clusters by clustering two or more of the feature points, and setting respective cluster symbols for multiple feature point clusters, an exercise pattern information accumulation unit for generating and storing information about a state transition between the multiple feature point clusters of the user, and an exercise state prediction unit for predicting a subsequent exercise state of the user by predicting a feature point cluster subsequent to a feature point cluster currently being generated for the user, based on state transition information.

14 Claims, 9 Drawing Sheets

(56) References Cited

U.S. PATENT DOCUMENTS

| | | | |
|---|---|---|---|
| 8,113,991 B2* | 2/2012 | Kutliroff | A63B 71/0622 348/77 |
| 9,195,304 B2* | 11/2015 | Shimomura | G06F 3/017 |
| 9,501,942 B2* | 11/2016 | Kaleal, III | G09B 5/02 |
| 9,703,387 B2* | 7/2017 | Nayak | G06F 3/017 |
| 2007/0126733 A1 | 6/2007 | Yang et al. | |
| 2011/0009241 A1* | 1/2011 | Lane | A63B 24/0087 482/8 |
| 2012/0021873 A1* | 1/2012 | Brunner | A63B 22/0235 482/9 |
| 2012/0214594 A1* | 8/2012 | Kirovski | A63F 13/42 463/36 |
| 2013/0203475 A1* | 8/2013 | Kil | G06Q 10/101 463/7 |
| 2013/0215028 A1* | 8/2013 | Givon | G06F 3/011 345/158 |
| 2013/0283214 A1 | 10/2013 | Kim et al. | |
| 2014/0147820 A1* | 5/2014 | Snow | G06F 19/3481 434/247 |
| 2014/0270351 A1* | 9/2014 | Hoof | G06T 7/2086 382/103 |
| 2014/0347479 A1* | 11/2014 | Givon | G06K 9/00342 348/143 |
| 2015/0039106 A1* | 2/2015 | Bonstrom | G06F 19/3481 700/91 |
| 2015/0097937 A1* | 4/2015 | Kord | G06T 7/80 348/77 |
| 2015/0196804 A1* | 7/2015 | Koduri | G06K 9/00342 482/8 |
| 2015/0325270 A1* | 11/2015 | Utsunomiya | G11B 27/3081 386/230 |
| 2016/0042656 A1* | 2/2016 | Lee | G09B 9/00 434/219 |
| 2016/0129343 A1* | 5/2016 | Domansky | A63F 13/428 463/7 |
| 2016/0158600 A1* | 6/2016 | Rolley | G06F 19/3481 482/9 |
| 2017/0004631 A1* | 1/2017 | Yang | G09B 5/02 |
| 2017/0100637 A1* | 4/2017 | Princen | A63B 71/0622 |
| 2017/0259155 A1* | 9/2017 | Park | A63B 71/0669 |

* cited by examiner

FITNESS DEVICE-BASED SIMULATOR AND SIMULATION METHOD USING THE SAME

CROSS REFERENCE TO RELATED APPLICATION

This application claims the benefit of Korean Patent Application No. 10-2015-0112286, filed Aug. 10, 2015, which is hereby incorporated by reference in its entirety into this application.

BACKGROUND OF THE INVENTION

1. Technical Field

The present invention generally relates to a fitness device-based simulator and a simulation method using the simulator and, more particularly, to a fitness device-based simulator and a simulation method using the simulator, which accumulate exercise pattern information about the motion of a user who exercises on a fitness device, predict the subsequent exercise state of the user from the accumulated exercise pattern information, and then control the operation of the fitness device, thus allowing the user to more stably and realistically experience virtual reality.

2. Description of the Related Art

Recently, with the development of various User Interface (UI) or User Experience (UX) technologies, various virtual reality systems for recognizing the motion of a user and operating a corresponding system have been introduced. For this, various techniques for recognizing the user's motion by extracting the skeletal structure information of the user have been developed, and various interactive systems that exploit them have been developed. In particular, in order to allow the user to perform various motions so as to provide a more realistic virtual reality system to the user, various types of virtual reality simulators based on a fitness device, such as a treadmill, have been used. However, conventional virtual reality simulators using a treadmill are disadvantageous in that only a system for driving the treadmill by simply analyzing the current exercise speed of a user is provided, and thus the operation of the treadmill by the user is not stable. The conventional virtual reality simulator, which considers only the exercise speed of the user in this way, deteriorates the user's convenience and prevents the user from being immersed in the virtual reality, thus making it impossible to provide the user with a virtual reality experience that is more realistic.

Meanwhile, Korean Patent Application Publication No. 2014-0144868 (Date of publication: Dec. 22, 2014) entitled "Treadmill and control method of the same" discloses a treadmill for automatically controlling the movement speed of a belt by sensing the position of a user, and a method for controlling the treadmill. However, the conventional treadmill control technology, such as Korean Patent Application Publication No. 2014-0144868, uses only the information obtained by simply sensing the position of the user or the exercise speed of the user in real time, and thus there is a limitation on the effective recognition of the user's continuous motions and the speed thereof. Further, the user's motion is a sequence of continuous actions over time, but the conventional treadmill control technology does not take into consideration the continuity of such user motion.

SUMMARY OF THE INVENTION

Accordingly, the present invention has been made keeping in mind the above problems occurring in a conventional virtual reality simulator using a fitness device, and an object of the present invention is to provide technology that constructs the motion information of a user in relation to continuous actions of the user, predicts the subsequent exercise state of the user using the previously constructed motion information, and feeds back the predicted subsequent exercise state to the driving system of the fitness device, thus enabling the fitness device to be more stably driven when the user performs various motions.

Another object of the present invention is to provide a fitness device-based virtual reality system, which defines technology for constructing exercise pattern information in relation to continuous motions of a user who exercises on a fitness device and predicting a subsequent exercise state, thus providing the user with a safer and more immersive virtual reality experience.

In accordance with an aspect of the present invention to accomplish the above objects, there is provided a fitness device-based simulator, including a feature point extraction unit for acquiring action-sensing information of a user who is located on a fitness device from one or more camera sensors, and extracting feature points for a body skeletal structure of the user per unit time based on the action-sensing information; a feature point cluster generation unit for generating multiple feature point clusters by clustering two or more of the feature points extracted by the feature point extraction unit within a preset period of time, and setting respective cluster symbols for the multiple feature point clusters; an exercise pattern information accumulation unit for generating and storing information about a state transition between the multiple feature point clusters of the user using the cluster symbols of the respective feature point clusters set by the feature point cluster generation unit; and an exercise state prediction unit for predicting a subsequent exercise state of the user by predicting a feature point cluster subsequent to a feature point cluster currently being generated for the user, based on the information about state transition between the multiple feature point clusters for the user, which is previously stored in the exercise pattern information accumulation unit.

The fitness device-based simulator may further include a fitness device control unit for controlling operation of the fitness device based on the subsequent exercise state of the user predicted by the exercise state prediction unit.

The exercise pattern information accumulation unit may generate and store the state transition information by applying sequential classification using a Markov model to cluster symbols of the multiple feature point clusters for the user.

The state transition information may include transition probabilities obtained when transitions between respective cluster symbols of multiple feature point clusters are made.

The exercise state prediction unit may predict the subsequent exercise state of the user by predicting a feature point cluster corresponding to a subsequent cluster symbol having a highest transition probability as a feature point cluster subsequent to the feature point cluster currently being generated for the user, based on the transition probabilities included in the state transition information.

The feature point cluster generation unit may generate multiple feature point clusters by clustering two or more of the feature points extracted by the feature point extraction unit within the preset period of time using a K-means clustering algorithm.

The fitness device may be a treadmill that enables 1D or 2D walking motion of the user.

In accordance with another aspect of the present invention to accomplish the above objects, there is provided a fitness device-based simulation method, including acquiring, by a feature point extraction unit, action-sensing information of a user who is located on a fitness device from one or more camera sensors; extracting, by the feature point extraction unit, feature points for a body skeletal structure of the user based on the action-sensing information; generating, by a feature point cluster generation unit, multiple feature point clusters by clustering two or more of the feature points extracted by the feature point extraction unit within a preset period of time; setting, by the feature point cluster generation unit, respective cluster symbols for the multiple feature point clusters; generating and storing, by an exercise pattern information accumulation unit, information about a state transition between the multiple feature point clusters of the user using the cluster symbols of the respective feature point clusters set by the feature point cluster generation unit; and predicting, by an exercise state prediction unit, a subsequent exercise state of the user by predicting a feature point cluster subsequent to a feature point cluster currently being generated for the user, based on the information about the state transition between the multiple feature point clusters for the user, which is previously stored in the exercise pattern information accumulation unit.

The fitness device-based simulation method may further include, controlling, by a fitness device control unit, operation of the fitness device based on the subsequent exercise state of the user predicted by the exercise state prediction unit.

Generating and storing the information about the state transition between the multiple feature point clusters of the user may be configured such that the exercise pattern information accumulation unit generates and stores the state transition information by applying sequential classification using a Markov model to cluster symbols of the multiple feature point clusters for the user.

The state transition information may include transition probabilities obtained when transitions between respective cluster symbols of multiple feature point clusters are made.

Predicting the subsequent exercise state of the user may be configured such that the exercise state prediction unit predicts the subsequent exercise state of the user by predicting a feature point cluster corresponding to a subsequent cluster symbol having a highest transition probability as a feature point cluster subsequent to the feature point cluster currently being generated for the user, based on the transition probabilities included in the state transition information.

Generating the multiple feature point clusters may be configured such that the feature point cluster generation unit generates multiple feature point clusters by clustering two or more of the feature points extracted by the feature point extraction unit within the preset period of time using a K-means clustering algorithm.

The fitness device may be a treadmill that enables 1D or 2D walking motion of the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, the configuration and operation of a fitness device-based simulator according to the present invention will be described in detail with reference to the attached drawings.

Figure 1:
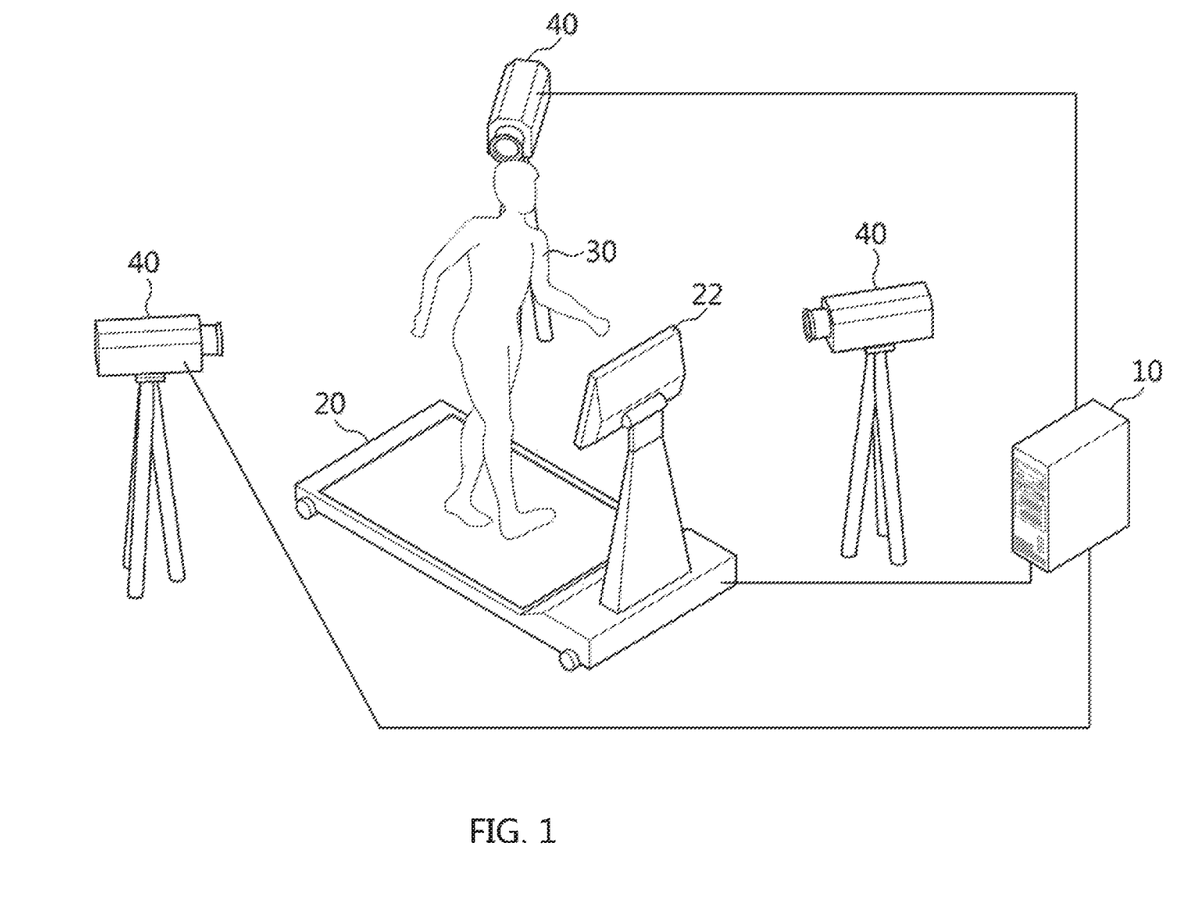
FIG. 1 is a diagram showing the interaction between a fitness device-based simulator and a fitness device according to the present invention.

FIG. 1 is a diagram showing the interaction between a fitness device-based simulator and a fitness device according to the present invention.

Referring to FIG. 1, an overall simulation system including the fitness device-based simulator according to the present invention includes a fitness device-based simulator 10, a fitness device 20 equipped with a display means 22, and one or more camera sensors 40 for acquiring the action-sensing information of a user 30 who is located on the fitness device 20.

The fitness device 20 is exercise equipment for improving the health of the user 30. As the fitness device 20, a treadmill may be used, which secures stationary space for motion of the user 30, that is, the walking or running motion of the user 30, without actually moving outdoors, in limited indoor space, and which is operated by an internal drive motor or actuator so that the difficulty level of the exercise effect can be adjusted, and which allows one-dimensional (1D) or two-dimensional (2D) walking motion of the user, but the fitness device of the present invention is not limited thereto. The fitness device 20 is equipped with the display means 22, which displays a metaverse space screen (e.g. a jogging course screen or the like) that allows the user 30 to more realistically experience virtual reality, thus enabling the user 30 to select any one of multiple course screens and access the metaverse space. Accordingly, the user 30 who exercises on the fitness device 20 may be provided with a metaverse space selected from among various jogging courses in the form of virtual reality 3D graphics via the display means 22, and may check his or her exercise state while viewing an avatar on which his or her image is projected in the metaverse space. Meanwhile, the fitness device 20 allows the user 30 to be provided with a realistic effect by operating the internal drive motor or actuator depending on the virtual reality environment of the metaverse space displayed on the display means 22 in synchronization with the display means 22. For example, when the user 30 reaches a region with an uphill or downhill incline in the metaverse space displayed on the display means 22, the fitness device 20 may operate an actuator for adjusting the slope of the track of the fitness device 20 depending on the slope of the uphill or downhill incline in the metaverse space, thereby providing the user 30 with a realistic effect that matches the slope. However, when it is impossible to determine which motion is to be performed by the user 30 on the fitness device 20, if the operation of the fitness device 20 is merely synchronized with the metaverse space screen displayed on the display means 22, the user 30 may be confronted with danger due to the motional variable of the user 30. To prevent this situation, the fitness device-based simulator 10 according to the present invention analyzes the action-sensing information about the motion of the user 30 acquired from the camera sensors 40, predicts the subsequent exercise state of the user 30, and controls the operation of the fitness device 20 based on the predicted exercise state of the user 30, thus securing the safety of the user 30 in consideration of the subsequent exercise state of the user 30.

Figure 2:
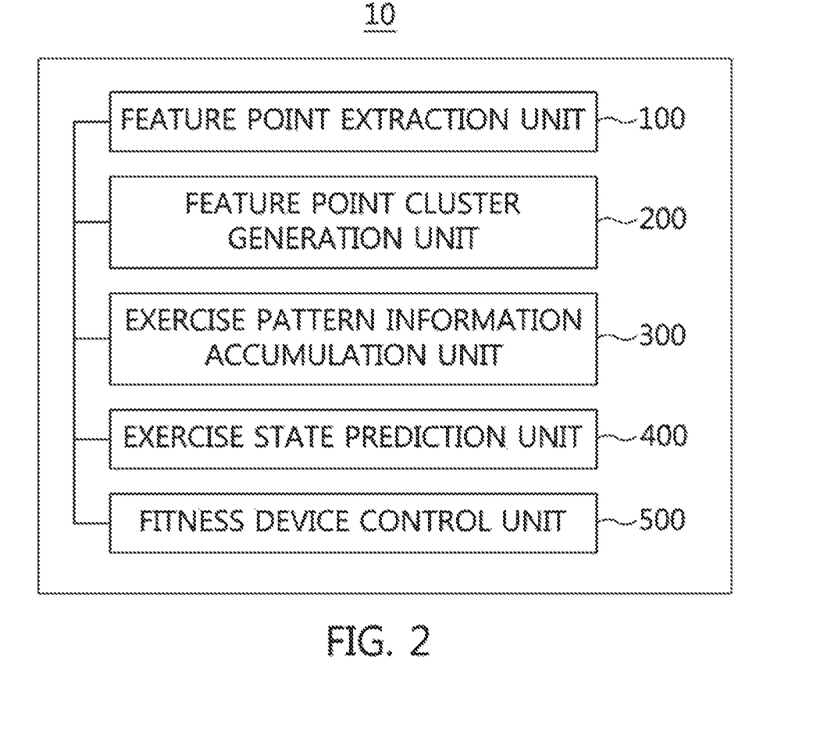
FIG. 2 is a block diagram showing the more detailed configuration of the fitness device-based simulator of FIG. 1 according to the present invention.

More specifically, the detailed configuration of the fitness device-based simulator 10 according to the present invention will be described below. Referring to FIG. 2, the fitness device-based simulator 10 includes a feature point extraction unit 100, a feature point cluster generation unit 200, an exercise pattern information accumulation unit 300, an exercise state prediction unit 400, and a fitness device control unit 500.

Figure 3:
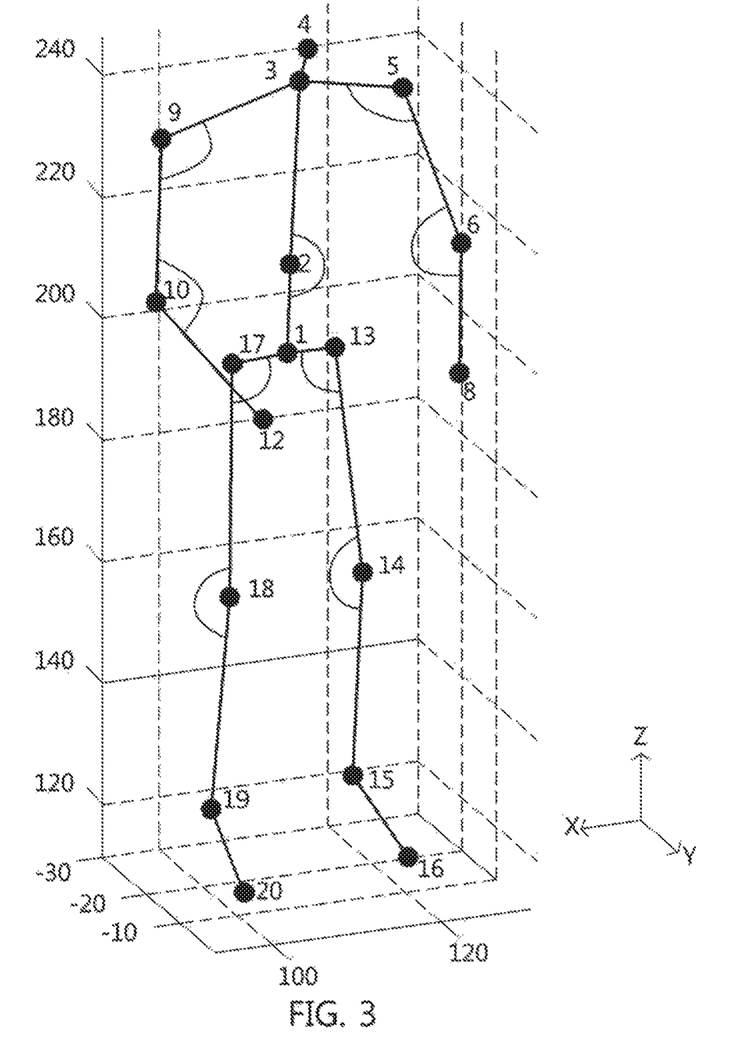
FIG. 3 is a diagram illustratively showing the feature points of a body skeletal structure of a user.

The feature point extraction unit 100 acquires action-sensing information about the motion of the user 30 who is located on the fitness device 20 from one or more camera sensors 40. Here, multiple camera sensors 40 may be installed around the user 30, and may acquire, as the action-sensing information of the user 30, action-sensing information that includes one or more of RGB color information, depth image information, and skeletal structure information. The method for acquiring the depth image information and the skeletal structure information in the present invention may include various methods, such as a method for acquiring depth image information and real-time skeletal tracking information using a depth camera and a method for acquiring 3D information by performing stereo matching on images acquired using a multi-view camera. The feature point extraction unit 100 extracts feature points for the body skeletal structure of the user 30 per unit time based on the action-sensing information about the motion of the user 30, acquired from the camera sensors 40. The feature points for the body skeletal structure of the user 30 per unit time may be extracted from pieces of information that express all motions of the user 30, such as the motion vector of the user 30 obtained from RGB color information, a relative distance, obtained from depth image information, and 3D coordinates and angular velocities of joints, obtained from the skeletal structure information. The feature points for the body skeletal structure of the user 30, extracted by the feature point extraction unit 100, may be extracted as feature points (e.g. feature points based on the angles of the joints) acquired from a 3D coordinate system represented by X/Y/Z axes, as illustratively shown in FIG. 3.

Figure 4A:
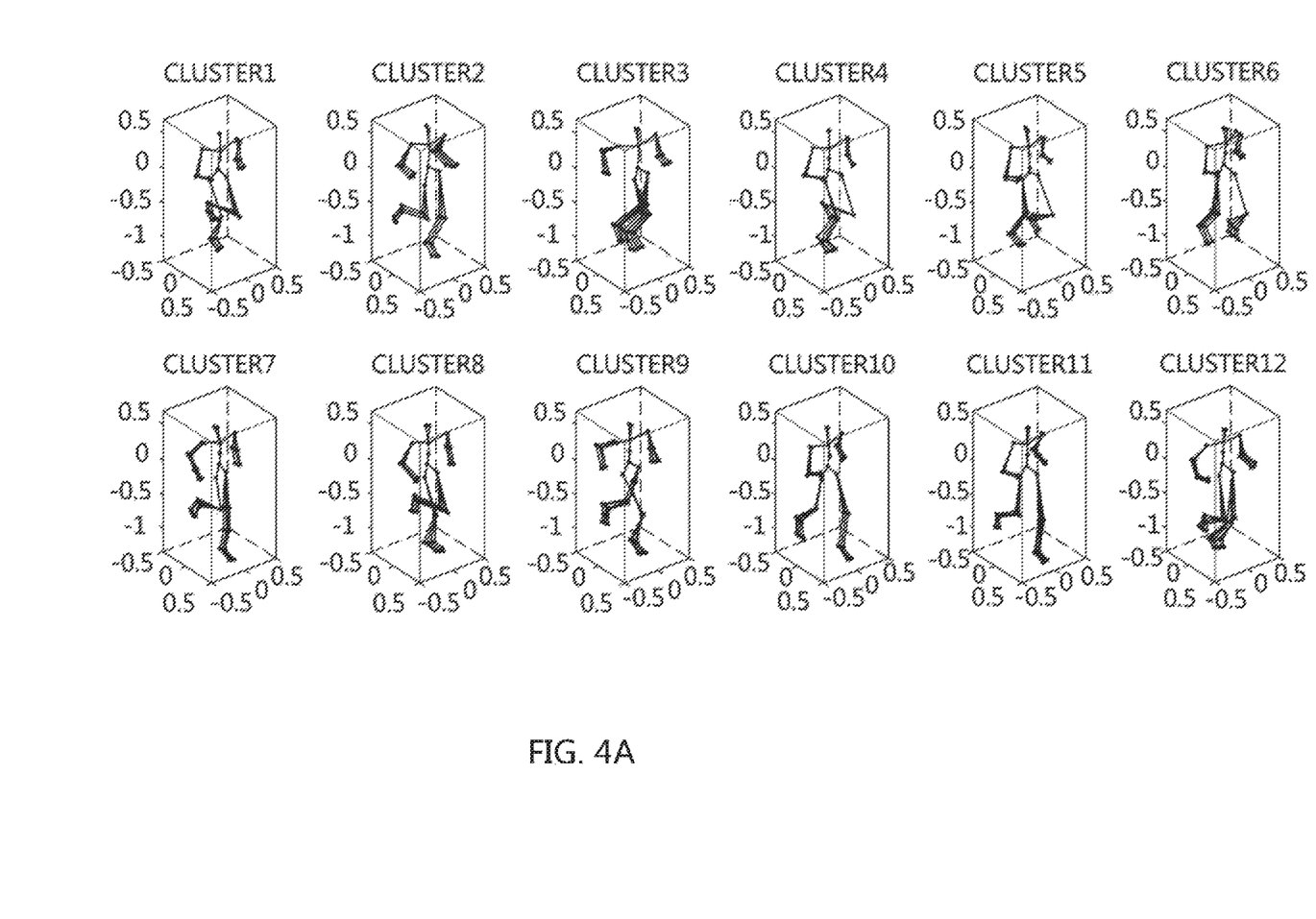
FIGS. 4A and 4B are diagrams illustratively showing feature point clusters for feature points of the body skeletal structure of the user.
Figure 4B:
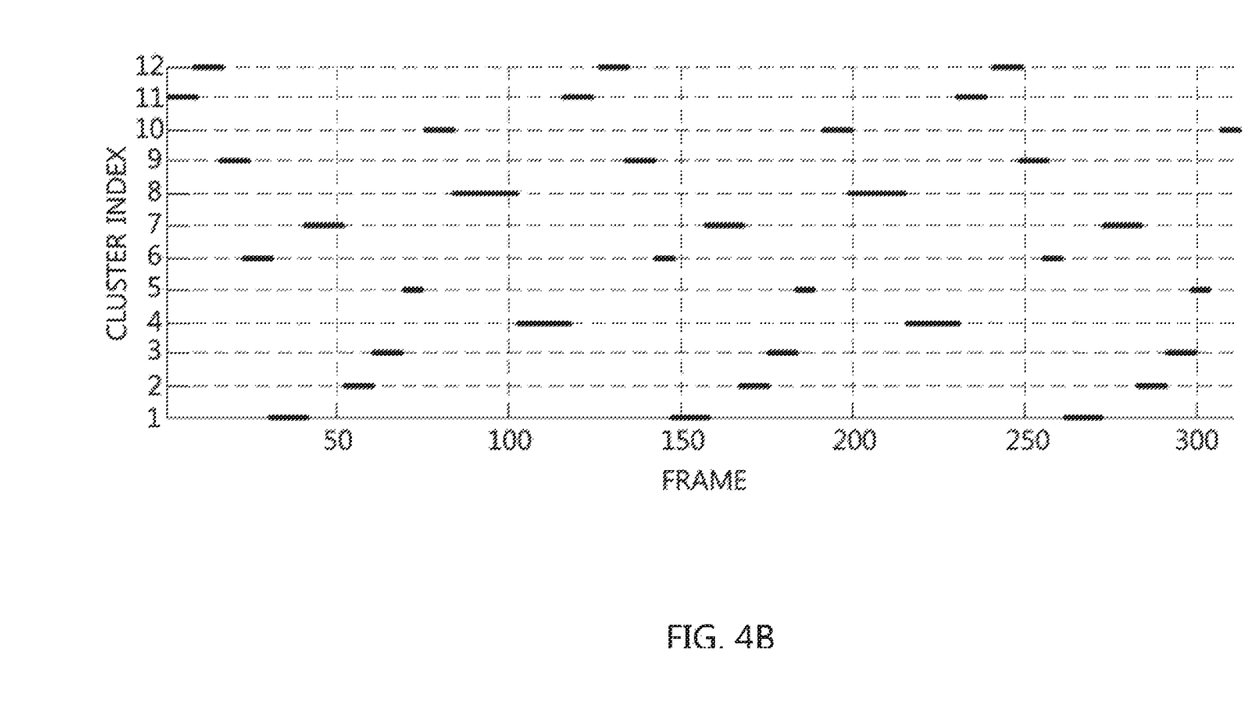

The feature points extracted by the feature point extraction unit 100 vary minutely in each frame of the action-sensing information for the user 30 acquired by the camera sensors 40, but similar feature points may be grouped into a single cluster at short time intervals. The feature point cluster generation unit 200 generates multiple feature point clusters, obtained by clustering two or more of the feature points extracted by the feature point extraction unit 100 within a preset period of time. For example, as shown in FIGS. 4A and 4B, the feature point cluster generation unit 200 may group the feature points extracted from the action-sensing information of the user 30 into 12 clusters within a preset period of time corresponding to 300 frames (10 seconds). Referring to FIG. 4B, it can be seen that the motion of the user 30 located on the fitness device 20 exhibits the repetition of a state transition distribution of patterns along a time axis through multiple clusters (e.g. 12 clusters) grouped by the feature point cluster generation unit 200. Here, the clustering algorithm used by the feature point cluster generation unit 200 to group the feature points, extracted by the feature point extraction unit 100 within a preset period of time, into multiple feature point clusters may be implemented using a K-means clustering algorithm technique, but the clustering algorithm is not limited thereto, and various unsupervised classification techniques may be used. Meanwhile, the feature point cluster generation unit 200 sets respective cluster symbols for the multiple feature point clusters that have been grouped. That is, the feature point cluster generation unit 200 groups a set of feature points having one or more dimensions into a single cluster, and represents the cluster using a symbol.

Figure 5A:
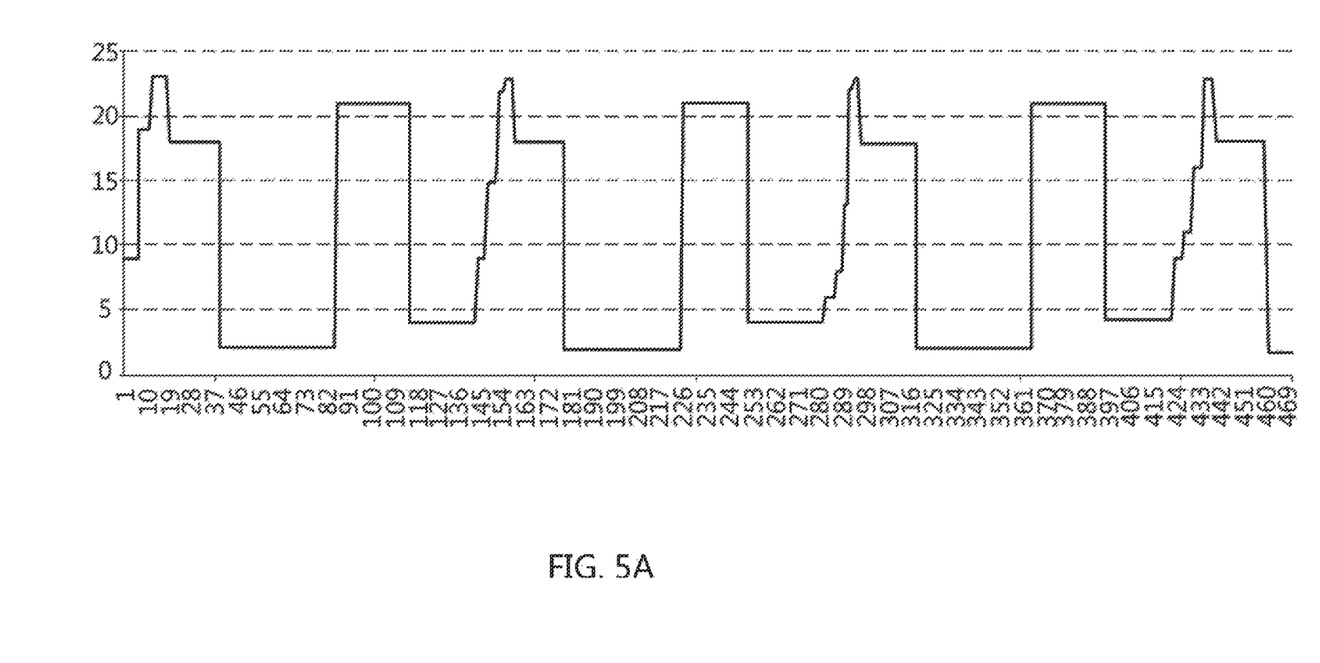
FIGS. 5A and 5B are diagrams illustratively showing the variation patterns of feature point clusters per unit time for the repeated motion of the user.
Figure 5B:
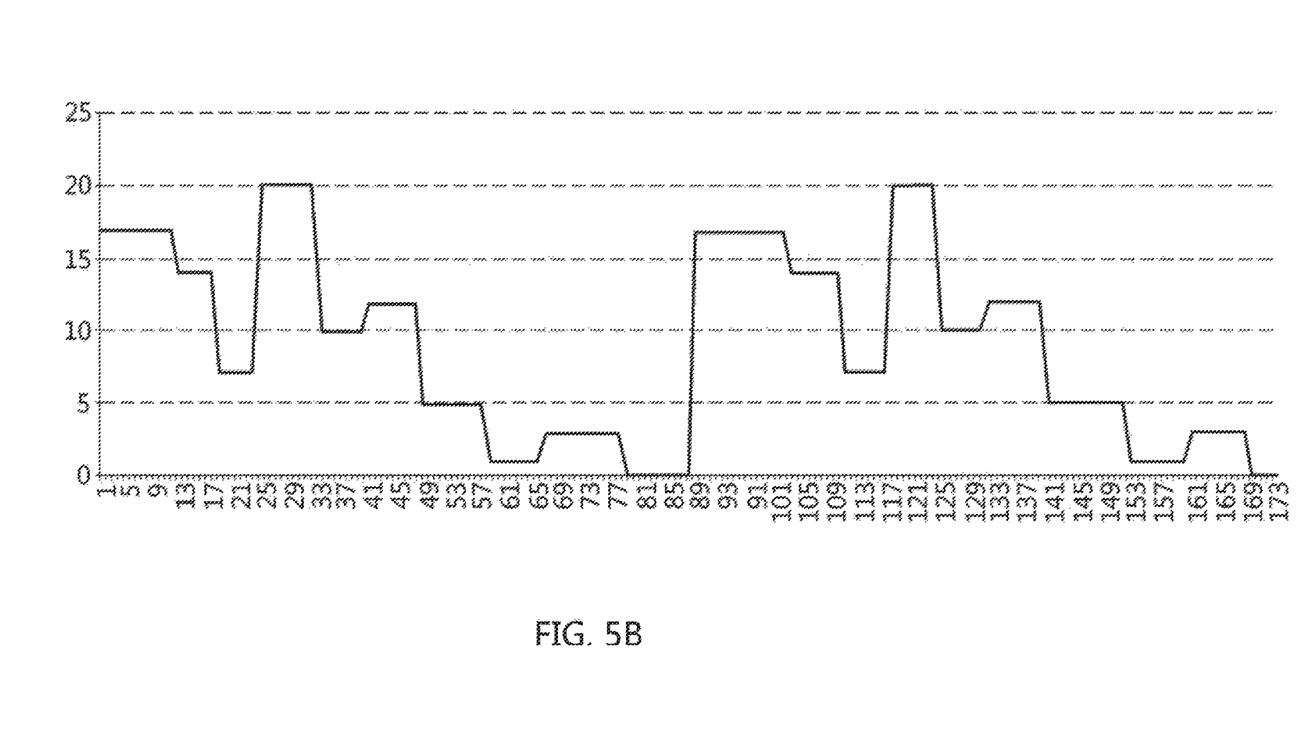
Figure 6:
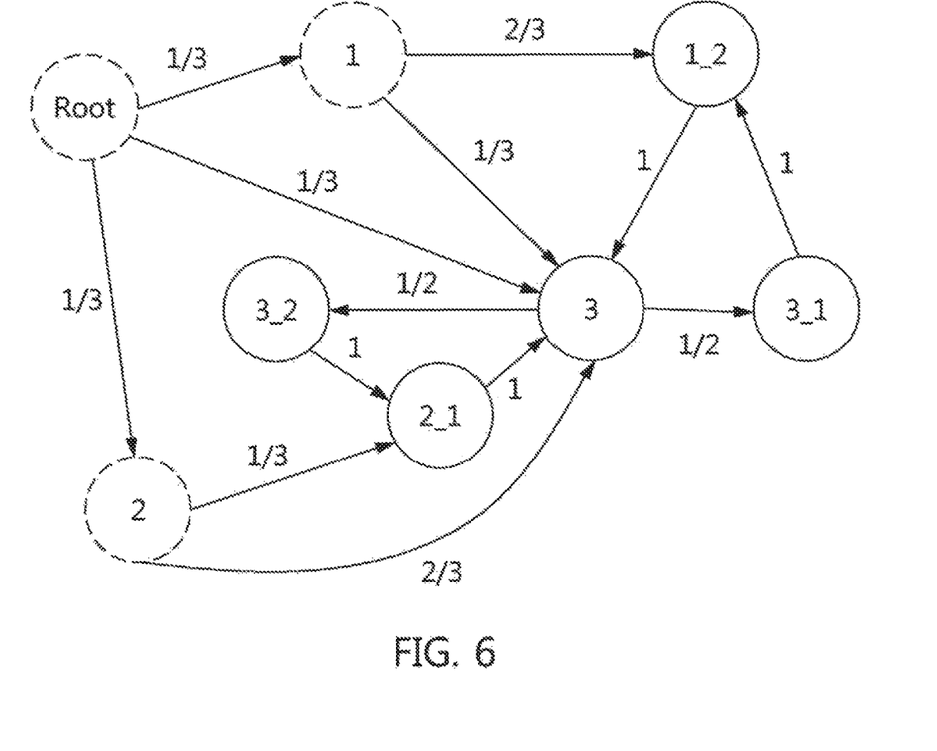
FIG. 6 is a state transition diagram illustratively showing variation in cluster symbols relative to the user's motion.

When feature points are extracted for the motion of the user 30, multiple feature point clusters into which the extracted feature points are grouped are sequentially indicated as consistent patterns depending on the motion of the user 30 along a time axis. Referring to FIGS. 5A and 5B, when the feature point cluster generation unit 200 groups different motions of the user 30 into 25 feature point clusters, variation patterns of feature point clusters per unit time that periodically repeat in response to repeated motions of the user 30 may be seen. In FIG. 5A, variation patterns of feature point clusters per unit time representing the walking action of the user 30 may be seen, and in FIG. 5B, variation patterns of feature point clusters per unit time representing the running action of the user 30 may be seen. The variation patterns of the feature point clusters per unit time that are repeated depending on the motion of the user 30 may represent the motion of the user using a sequential array of cluster symbols. When information about the variation patterns of the cluster symbols for the motion of the user 30 is used, the exercise state subsequent to the specific exercise state of the user 30 may be predicted. Based on the scheme for predicting the subsequent exercise state of the user 30, the exercise pattern information accumulation unit 300 generates information about a state transition between the multiple feature point clusters for the motion of the user 30 using the symbols of the respective feature point clusters set by the feature point cluster generation unit 200, and stores and accumulates the state transition information. The variation in the cluster symbols for the motion of the user 30 may be represented by a state transition diagram, such as that illustratively shown in FIG. 6. The exercise pattern information accumulation unit 300 may generate a diagram for a sequential state transition between cluster symbols by applying a sequential classification technique using a Markov model to the variation in the cluster symbols of multiple feature point clusters for the user 30, which are repeated as uniform patterns, and may accumulate and learn the state transition information. Meanwhile, even if the variation in the cluster symbols exhibits a uniform pattern, the same pattern is not always entirely repeated every time. Accordingly, it is preferable that the information about a state transition between cluster symbols, which is accumulated and previously stored in the exercise pattern information accumulation unit 300, should also include a transition probability when a transition from the previous cluster symbol to each cluster symbol is made.

The exercise state prediction unit 400 predicts the feature point cluster subsequent to the feature point cluster, currently being generated by the feature point cluster generation unit 200 for the motion of the user 30, based on the information about state transition between multiple feature point clusters (cluster symbols) for the motion of the user 30, which is previously stored in the exercise pattern information accumulation unit 300, thus predicting the subsequent exercise state of the user 30. That is, the exercise state prediction unit 400 searches the information about a state transition for the motion of the user 30, which is previously accumulated and stored in the exercise pattern information accumulation unit 300, for a subsequent cluster symbol, to which a transition from the cluster symbol for the current motion of the user 30 may be made. Thereafter, the exercise state prediction unit 400 predicts the exercise state of the user 30, corresponding to the feature point cluster of the found subsequent cluster symbol, as the subsequent exercise state. Here, when multiple cluster symbols are available as subsequent cluster symbols to which a transition from the cluster symbol for the current motion of the user 30 can be made, the feature point cluster corresponding to a subsequent cluster symbol having the highest transition probability based on the transition probabilities included in the state transition information is predicted as the feature point cluster subsequent to the feature point cluster for the current motion of the user 30, and then the subsequent exercise state of the user 30 is predicted.

The fitness device control unit 500 controls the operation of the fitness device 20 based on the subsequent exercise state of the user 30, predicted by the exercise state prediction unit 400. Here, the fitness device control unit 500 generates a control signal required to control the operation of the internal drive motor or actuator of the fitness device 20 depending on the predicted subsequent exercise state of the user 30, and transmits the control signal to the microcomputer of the fitness device 20, thus controlling the operation of the fitness device 20.

Hereinafter, a fitness device-based virtual reality simulation method according to the present invention will be described in detail with reference to the attached drawings. Here, a repeated description of some components identical to those of the fitness device-based virtual reality simulator according to the present invention, which has been described above with reference to FIGS. 1 to 6, will be omitted.

Figure 7:
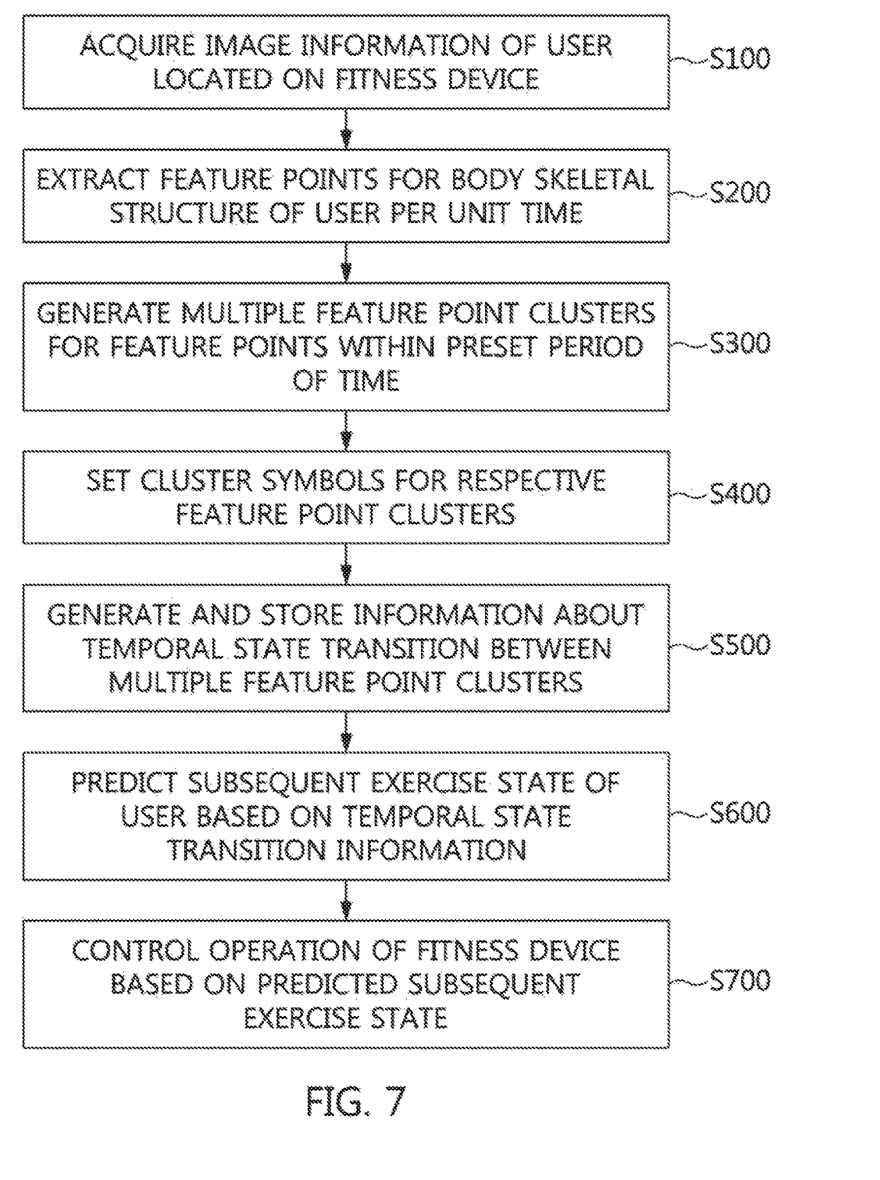
FIG. 7 is a flowchart showing a fitness device-based virtual reality simulation method according to the present invention.

FIG. 7 is a flowchart showing a fitness device-based virtual reality simulation method according to the present invention.

Referring to FIG. 7, in the fitness device-based virtual reality simulation method according to the present invention, the feature point extraction unit 100 acquires action-sensing information about the motion of the user 30, who is located on the fitness device 20, from one or more camera sensors 40 at step S100. Further, the feature point extraction unit 100 extracts feature points for the body skeletal structure of the user 30 based on the action-sensing information about the motion of the user 30, acquired from the camera sensors 40 at step S100, at step S200, and transmits information about the extracted feature points to the feature point cluster generation unit 200.

Next, the feature point cluster generation unit 200 generates multiple feature point clusters by clustering two or more of the feature points, extracted by the feature point extraction unit at step S200 within a preset period of time, at step S300. Further, the feature point cluster generation unit 200 sets respective cluster symbols for the multiple feature point clusters, generated at step S300, at step S400.

Thereafter, the exercise pattern information accumulation unit 300 generates information about a state transition between the multiple feature point clusters for the motion of the user 30, generated at step S300, using the symbols of the respective feature point clusters set by the feature point cluster generation unit 200 at step S400, and accumulates and stores the state transition information at step S500.

Then, the exercise state prediction unit 400 predicts the subsequent exercise state of the user 30 by predicting the feature point cluster subsequent to the feature point cluster currently being generated for the motion of the user 30 by the feature point cluster generation unit 200, based on the information about a state transition between the multiple feature point clusters for the motion of the user 30, which is previously stored in the exercise pattern information accumulation unit 300 at step S500, at step S600.

Finally, the fitness device control unit 500 controls the operation of the fitness device 20 based on the subsequent exercise state of the user 30, predicted by the exercise state prediction unit 400 at step S600, at step S700.

In accordance with the present invention, there is an advantage in that the motion information of a user is constructed in relation to the continuous actions of the user, the subsequent exercise state of the user is predicted using the previously constructed motion information, and the predicted subsequent exercise state is fed back into the driving system of the fitness device, thus enabling the fitness device to be more stably driven when the user performs various motions.

Further, in accordance with the present invention, there is an advantage in that a fitness device-based virtual reality system can be provided, which defines technology for constructing exercise pattern information in relation to the continuous motions of a user who exercises on a fitness device and predicting a subsequent exercise state, thus providing the user with a safer and more immersive virtual reality experience.

As described above, optimal embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:
1. A fitness device-based simulator comprising:
    a processor; and
    a memory storing units comprising computer executable code configured and executed by the processor,
    wherein the units comprise:
    a feature point extraction unit which acquires action-sensing information of a user who is located on a fitness device from one or more camera sensors, and extracts feature points for a body skeletal structure of the user per unit time based on the action-sensing information;
    a feature point cluster generation unit which generates multiple feature point clusters by, clustering two or more of the feature points extracted by the feature point extraction, unit within a preset period of time, and sets respective cluster symbols for the multiple feature point clusters;

an exercise pattern information accumulation unit which generates and stores information about a state transition between the multiple feature point clusters of the user using the cluster symbols of the respective feature point clusters set by the feature point cluster generation unit; and an exercise state prediction unit which predicts a subsequent exercise state of the user by predicting a feature point cluster subsequent to a feature point cluster currently being generated for the user, based on the information about state transition between the multiple feature point clusters for the user, which is previously stored in the exercise pattern information accumulation unit.

2. The fitness device-based simulator of claim 1, wherein the units further comprise a fitness device control unit which controls operation of the fitness device based on the subsequent exercise state of the user predicted by the exercise state prediction unit.

3. The fitness device-based simulator of claim 1, wherein the exercise pattern information accumulation unit generates and stores the state transition information by applying sequential classification using a Markov model to cluster symbols of the multiple feature point clusters for the user.

4. The fitness device-based simulator of claim 3, wherein the state transition information includes transition probabilities obtained when transitions between respective cluster symbols of multiple feature point clusters are made.

5. The fitness device-based simulator of claim 4, wherein the exercise state prediction unit predicts the subsequent exercise state of the user by predicting a feature point cluster corresponding to a subsequent cluster symbol having a highest transition probability as a feature point cluster subsequent to the feature point cluster currently being generated for the user, based on the transition probabilities included in the state transition information.

6. The fitness device-based simulator of claim 5, wherein the feature point cluster generation unit generates multiple feature point clusters by clustering two or more of the feature points extracted by the feature point extraction unit within the preset period of time using a K-means clustering, algorithm.

7. The fitness device-based simulator of claim 1, wherein the fitness device is a treadmill that enables 1D or 2D walking motion of the user.

8. A fitness device-based simulation method comprising:
acquiring, by a feature point extraction unit, action-sensing information of a user who is located on a fitness device from one or more camera sensors;
extracting, by the feature point extraction unit, feature points for a body skeletal structure of the user based on the action-sensing information;
generating, by a feature point cluster generation unit, multiple feature point clusters by clustering two or more of the feature points extracted by the feature point extraction unit within a preset period of time;
setting, by the feature point cluster generation unit, respective cluster symbols for the multiple feature point clusters;
generating and storing, by an exercise pattern information accumulation unit, information about a state transition between the multiple feature point clusters of the user using the cluster symbols of the respective feature point clusters set by the feature point cluster generation unit; and
predicting, by an exercise state prediction unit, a subsequent exercise state of the user by predicting a feature point cluster subsequent to a feature point cluster currently being generated for the user, based on the information about the state transition between the multiple feature point clusters for the user, which is previously stored in the exercise pattern information accumulation unit.

9. The fitness device-based simulation method of claim 8, further comprising, controlling, by a fitness device control unit, operation of the fitness device based on the subsequent exercise state of the user predicted by the exercise state prediction unit.

10. The fitness device-based simulation method of claim 8, wherein generating and storing the information about the state transition between the multiple feature point clusters of the user is configured such that the exercise pattern information accumulation unit generates and stores the state transition information by applying sequential classification using a Markov model to cluster symbols of the multiple feature point clusters for the user.

11. The fitness device-based simulation method of claim 10, wherein the state transition information includes transition probabilities obtained when transitions between respective cluster symbols of multiple feature point clusters are made.

12. The fitness device-based simulation method of claim 11, wherein predicting the subsequent exercise state of the user is configured such that the exercise state prediction unit predicts the subsequent exercise state of the user by predicting a feature point cluster corresponding to a subsequent cluster symbol having a highest transition probability as a feature point cluster subsequent to the feature point cluster currently being generated for the user, based on the transition probabilities included in the state transition information.

13. The fitness device-based simulation method of claim 12, wherein generating the multiple feature point clusters is configured such that the feature point cluster generation unit generates multiple feature point clusters by clustering two or more of the feature points extracted by the feature point extraction unit within the preset period of time using a K-means clustering algorithm.

14. The fitness device-based simulation method of claim 8, wherein the fitness device is a treadmill that enables 1D or 2D walking motion of the user.

* * * * *